United States Patent Office 3,763,248
Patented Oct. 2, 1973

3,763,248
PROCESS FOR PRODUCTION OF POLY-
BROMINATED AROMATICS
Lawrence C. Mitchell, Southfield, Mich., assignor to
Ethyl Corporation, Richmond, Va.
No Drawing. Filed Mar. 2, 1971, Ser. No. 120,345
Int. Cl. C07c 25/18
U.S. Cl. 260—649 D                              10 Claims

ABSTRACT OF THE DISCLOSURE

A process for polybrominating aromatic compounds by reacting an aromatic compound with bromine at a temperature sufficient to sustain a rapid reaction rate is improved by conducting the process in the presence of a halogenation catalysts; for example, metal halides where the metal is selected from aluminum and iron, and solvent quantities of methylene bromide.

BACKGROUND OF THE INVENTION

The halogenation of aromatic compounds is generally known in the art. However, in the very recent past, halogenated aromatic compounds have found use as flame retardants in various polymer substrates. Such halogenated aromatics have been found to be extremely effective additive-type flame retardants, and processes for their production have therefore become relatively more important.

The difficulty in halogenating aromatics is that the addition of each successive halogen atom deactivates the aromatics nucleus and makes subsequent halogen addition more difficult; for example, the addition of the second chlorine atom to chlorobenzene is more difficult by factor of 8.5:1 when compared with the energy requiredment for addition of the first chlorine atom.

In the production of polybrominated aromatic compounds in which the aromatic nucleus is highly brominated, the reaction is difficult because the product is a solid and tends to agglomerate during the reaction, thus increasing the difficulty of further halogenation that much more.

For example, in a process of producing polybrominated aromatic compounds, several recent patents have suggested the use of fuming sulfuric acid (oleum) as a suitable reaction medium (see U.S. Pats. 3,232,959 and 3,285,-995). The sulfuric acid acts as a solvent; and sulfur trioxide oxidizes the hydrogen bromide back to bromine, thus permitting complete utilization of bromine. However, this process suffers from the difficulty of the product forming solid material which then is very difficult to brominate further. Also, the occlusion of sulfuric acid in the solid product results in impurities which are difficult to remove.

The use of Friedel-Crafts catalysts in the classical approach to brominating aromatic compounds results in the production of dibromo derivatives of the aromatic compounds. Certain improvements have been made; for example, see U.S. Pat. 3,285,965 in which the aromatics are brominated in an inert solvent and in the presence of chlorine and a halogenation catalyst. However, up to 20 percent by weight of excess bromine must be used in this process; and the excess bromine is taken up by addition of a $C_{2-4}$ alkylene to produce additional dihalide. The process is difficult to control and requires the use of chlorine to oxidize the HBr back to elemental bromine with the subsequent problem of disposing of HCl. Also, the alkylene must be continuously added to make up solvent loses and quench the excess bromine.

In another process French 69002243, the bromination of biphenyl using $AlCl_3$ catalyst without a solvent is carried out. However, this process suffers from the serious disadvantage of the partially brominated product becoming so viscous that special mixers are required to continue the bromination of the solid material.

Thus, it is an object of this invention to brominate aromatic compounds in a homogeneous system. A further object is to brominate aromatic compounds without the use of special equipment required to handle solid product. A further object is to brominate aromatic compounds without using a secondary oxidation agent for the conversion of HBr to elemental bromine. A still further object is to produce highly brominated aromatic compounds suitable for use as additive-type flame retardants. These and other objects will become apparent in the following description of the invention.

It has now been found that aromatic compounds can be highly brominated using a improved process according to this invention. Thus, the invention is in a process for the production of polybrominated aromatic compounds and mixtures thereof having up to about 10 bromine atoms per molecule by reacting an aromatic compound with bromine at a temperature sufficient to allow a rapid rate of reaction, the improvement comprising conducting said process in the presence of a halogenation catalyst and solvent quantities of methylene bromide.

The axact nature of the aromatic compounds which may be brominated by the process of this invention is not critical since the invention is applicable to a large variety of aromatic compounds. For example, the prior art shows many types of aromatic compounds which are suitable for bromination. Theimproved process of this invention utilizes the mono- or polynuclear aromatic compounds having either condensed or separated aromatic nuclei, their partially halogenated derivatives, their normal alkyl-substituted derivatives where the alkyl radical has up to 10 carbon atoms, and their branched alkyl-substituted derivatives wherein the branched alkyl radical is not α-substituted and has up to about 10 carbon atoms. Typical of the unsubstituted condensed or separated mono- or polynuclear aromatic compounds are benzene, naphthalene, anthracene, phenanthrene, diphenyl, triphenyl, tetraphenyl, diphenyl benzene, perylene, diphenyl ether, and the like. Typical partially halogenated derivatives may be fluoro-, chloro-, bromo-, or iodo- derivatives; for example, mono-, di-, tri-, and tetra- halogenated derivatives are typical of the partially halogenated compounds. Typical normal alkyl substituted derivatives are the methyl, ethyl, propyl, butyl, pentyl, hexyl, heptyl, octyl, nonyl, and decyl radicals. There may be more than one of such radicals substituted on the aromatic nucleus. The branched alkyl-substituted derivatives may be substituted-pentyl, hexyl, heptyl, octyl, nonyl, and decyl radicals or the 2,2-dimethylpropyl, 2,3-dimethylpropyl, 2-methylbutyl, 2,3-dimethylbutyl, 3,3-dimethylbutyl, 2,2,3,3 - tetramethylpentyl, 2-ethylbutyl, 2,3-diethylbutyl, 2-propylbutyl and like radicals. Preferred aromatic compounds which may be brominated by the improved process are diphenyl benzene, monochlorobenzene, and toluene. The most preferred aromatic compound is diphenyl.

The above aromatic compounds may be halogenated by the process of this invention using either chlorine or bromine. However, the process of this invention is more advantageously directed to the production of polybrominated aromatic compounds. Thus, it is preferred that bromine is used as the halogenating agent. While any method of introducing the bromine into the reaction system is sufficient provided that no other interfering cations or anions are introduced concurrently, it is preferred that elemental bromine in either liquid or gaseous form is introduced into the reaction medium.

The amount of bromine required for the improved process of this invention depends on the degree of bromination desired in the final product, the amount of catalyst used, and the particular reaction conditions employed. Because this improved process enables one to brominate an aromatic compound to almost any degree desired, the amount of bromine used will vary and is not considered critical, except when one is attempting to produce a brominated aromatic compound having a specific bromine content. It is generally sufficient if a slight excess above the theoretical requirements of the desired polybrominated aromatic compound is used. Thus, the amount of bromine used can range from 4 to about 12 moles of bromine per mole of aromatic compound to be brominated. Of course, the higher end of this ratio is clearly applicable to the more complex aromatic compounds which may be used in this improved process. It is not intended to suggest that 12 moles of bromine can be added to the simpler aromatic compounds; for example, benzene, toluene, xylene, naphthalene, diphenyl, and the like. More preferred amounts of bromine utilized by this improved process are from 6 to about 10 moles of bromine per mole of the aromatic compound to be brominated; such as, diphenyl, triphenyl, naphthalene, and their substituted derivatives as hereinabove described. A most preferred arount of bromine is from 7 to 9 moles of bromine per mole of such aromatic compound.

The reaction of bromine with the aromatic compound usually takes place in the liquid phase and is initially exothermic; that is, heat is given off as the reaction occurs. However, after the first few bromine atoms are added, it is advantageous to continue the reaction by adding heat to the reactants. A temperature sufficient to allow a rapid rate of reaction is all that is required. For example, when using liquid bromine, any temperature at which all of the reactants are present in the liquid phase forming a homogeneous mixture, even if such homogeneous reaction mixture must be achieved by increasing the pressure of the reaction system is all that is required. Careful attention should be paid to the conduct of the reaction since the evolution of gas on reaction may be quite violent if the reaction proceeds too fast. It has generally been found that the reaction may be carried out easily at temperatures from room temperature to about 200° C. A preferred temperature range is from room temperature to 100° C.

In the improved process of this invention, the aromatic compound and bromine are reacted in the presence of a halogenation catalyst and methylene bromide. Without the use of a halogenation catalyst, bromination is entirely too slow to be of any practical value. In addition, without the catalyst only one or two bromine atoms per aromatic nucleus can be added. Therefore, a halogenation catalyst is required. It has been found that a metal halide where the metal is selected from aluminum and iron is an especially useful and preferred halogenation catalyst in the improved process of the invention. Particularly preferred are aluminum chloride, aluminum bromide, iron chloride, iron bromide, and mixtures of these. The most preferred catalyst is either aluminum chloride or aluminum bromide.

The amount of catalyst added depends on the desired degree of bromination. The addition of larger amounts of catalyst allows a higher degree of bromination; but the amount of bromine present is a limiting factor to the degree of bromination. Generally, the catalyst is supplied to the reaction mixture in amounts of from 0.0001 to 0.1 mole of halogenation catalyst per mole of bromine. However, a preferred amount of catalyst is from 0.001 to 0.01 mole of halogenation catalyst per mole of bromine. A most preferred amount of catalyst for efficient production of the desired polybrominated aromatic compounds is from 0.001 to 0.007 mole per mole of bromine.

In conducting the process of this invention, it has also been found that the use of solvent quantities of methylene bromide allows the reaction to proceed to the point of producing highly brominated aromatic compounds without the product becoming a solid or agglomerating and preventing further bromination. Thus, it can be seen that the improvement of the use of halogenation catalyst and methylene bromide are both necessary to the production of the desired polybrominated aromatic compounds. Generally, sufficient solvent is required to adequately maintain the reactants and brominated products in homogeneous reaction mixtures. However, the reaction mixture should not be so diluted by the solvent as to require uneconomically large reaction vessels and large solvent inventories. Moreover, the temperature at which the reaction is carried out will affect the ability of the solvent to maintain a homogeneous reaction mixture. In view of these considerations the amount of solvent used should range from about saturated with the reactants and brominated products to about 100 moles of solvent per mole of reactants and brominated products. A more convenient method of stating the amount of solvent required is to base the amount solely on the starting aromatic compound to be brominated. Thus, methylene bromide is conveniently supplied in an amount of from about 8 to about 20 moles of methylene bromide per mole of aromatic compound. A more preferred solvent to aromatic compound ratio is from 10 to about 15 moles per mole of aromatic compound.

The time required for the reaction to go to completion depends upon the rate of reaction and the degree of bromination desired. It has been found that the reaction can be completed in as little as two hours and can continue for as long as 24 hours. Another limiting factor is the ability of the reaction vessel to handle the amount of gas evolved and thus allow rapid addition of the halogenation catalyst. In a highly efficient reaction system it is possible therefore for the reaction to be carried out to the desired degree of bromination in less than 2 hours. While the reaction time is not critical, it is preferred to carry out the reaction from about 2 to about 10 hours.

The product consists of the polybrominated aromatic compound in the solvent with unreacted bromine and small amounts of catalyst and partially brominated aromatic compound. When the desired degree of bromination has been obtained, the reaction may be stopped by cooling and successively washing the reaction mixture with acid, alkali, and water. The organic portion of these washings is dried and the solvent stripped to recover a crude product. The product can be recrystallized from solvent or washed with solvent and then have the solvent stripped on a rotary evaporator. The particular method of product recovery is not critical and any convenient method known in the art for recovering halogenated aromatic compounds from solvents may be used.

The following example illustrates the process of the present invention. Unless otherwise specified all parts and percentages are by weight.

EXAMPLE 1

A three-necked reaction vessel was equipped with a stirrer, thermometer and Dry Ice-cooled condenser which was directed to a NaOH trap containing 4.38 parts of 50.5 percent NaOH solution. A nitrogen purge was fed into the condenser trap line to assure no backup. The vessel was flushed with nitrogen and charged with 1 part of biphenyl, 112.5 parts of methylene bromide and approximately 8.7 parts of bromine. About 0.04 part of $AlCl_3$ was added to the reaction vessel and the mixture heated over one hour to about 83° C. with an oil bath. Additional catalyst, about 0.1 part, was added and heating continued for 30 minutes. A sample was taken after the mixture was cooled and examined by vapor phase chromatography. The product indicated by area percent analysis was a mixture of brominated biphenyls having an average of 7.6 bromine atoms per molecule of biphenyl, or more colloquially referred to as an average bromine number of 7.6.

The reaction mixture was reheated and 1.55 parts of bromine and 0.05 part of AlCl₃ were added. Heating continued for 35 minutes at 76–83° C. and an additional 0.04 part of AlCl₃ was added. After continued heating for 30 minutes at 83° C., the reaction mixture was cooled under nitrogen purge.

The gas evolved during the reaction was reacted in the NaOH trap which contained phenophthalein indicator. During the last portion of the reaction, the indicator changed color showing neutralization of the NaHO or an equivalent of 8.5 bromine atoms per molecule of biphenyl, more commonly referred to as 8.5 equivalents of bromine.

The work-up consisted of successive washings of 10 percent HCl, 5 percent NaOH and water (2 times). The organic layer from these separations was diluted with 62.5 parts of methylene bromide and then dried by adding sodium sulfate. The drying agent was then removed by filtration and the solvent stripped. The residue from the drying agent was also washed with methylene bromide and the filtrate added to the product prior to stripping. Solvent stripping was conducted on a rotary evaporator. The product was further dried to constant weight in vacuo and gave 5.89 parts of mixed brominated biphenyl compounds. Analysis by VPC indicated that the composition of the product (by area percent) was 65 percent nonabromobiphenyl, 21 percent octabromobiphenyl, 12 percent decabromobiphenyl, and 2–3 percent lower retention time materials assumed to be $Br_8$-isomers or heptabromobiphenyl.

The type of solvent used is critical since a reaction of diphenyl with bromine in the presence of a halogenation catalyst and various other solvents did not proceed to the extent desired. For example, nitromethane, 1,1,2,2-tetrachloroethylene, 1,1,2,3,4,4-hexachlorobutadiene, carbontetrachloride, and carbontetrabromide were tried, but were found to give either no reaction or only allow the regular amount of halogenation attributable to the action of the halogenation catalyst solely.

Following a similar procedure, Examples 2–8 were conducted. The apparatus used was essentially the same. Catalyst addition can be either through the use of an inverted ampule for adding solid powdered aluminum halide or for AlBr₃ by dissolving the AlBr₃ in methylene bromide and adding dropwise through a pressure-equalized adding funnel. Control of bromine losses by backflushing the condenser also allows greater reproducibility of the experiments and more efficient bromine usage. Caution should be exercised in adding the catalyst at a rate sufficient to maintain a rapid rate of reaction. Too much catalyst addition at one time causes extremely vigorous gas evolution. Work-up of the product may also be varied by precipitating the product as a solid from the solvent after it is thoroughly washed. The quantities of reactants, conditions and results are summarized in Table 1 following.

favorably to form polybrominated aromatic compounds according to the reaction conditions specified. The $CH_2Br_2$ would be considered by one skilled in the art as a reactant according to the normal Friedel-Crafts alkylation process by which the aromatic nucleus is alkylated. Instead, it has been found that the aromatic nucleus is polybrominated in the present invention; for example, the following comparative example illustrates the reaction of diphenyl, methylene bromide and AlBr₃. Again, the apparatus used and the general procedure followed is substantially as described in Example 2.

EXAMPLE 9

To a reaction vessel, fitted with an ampule for adding a solid catalyst, was added 17.8 parts of biphenyl and 197.5 parts of methylene bromide. The ampule was filled with 2.3 parts of AlBr₃. The AlBr₃ was slowly added to the reaction vessel over a period of 2 hours and 25 minutes with slow heating from room temperature to about 75° C. After the catalyst was added, heating was continued for about 2 hours and 25 minutes up to 96° C. The evolution of HBr gas was evidence of reaction during the entire period.

The heating was discontinued and sufficient 10 percent HCl solution was added to stop the reaction. The solution turned rust colored and was separated into an organic phase and an aqueous phase. The organic layer was washed twice with water and examined by vapor phase chromatography. The only known peaks were solvent and biphenyl. No crystalline polybrominated product could be isolated. Work-up of the reaction product and examination by infrared spectroscopy and NMR indicated that oligomers containing biphenyl moieties connected by methylene bridges were present. Such products would be expected in Friedel-Crafts alkylation.

The above example illustrates that the methylene bromide will react with diphenyl to give unspecified products. However, in the presence of bromine the reaction to produce polybrominated aromatics is much faster and $$CH_2Br_2$$

does not react at a rate sufficient to alkylate the aromatic nucleus. In view of the reaction in Example 9 above, the bromination being exclusive is indeed extremely surprising.

Similar results are obtained using large scale runs in glassware. For instance, the following example describes the process of the present invention as carried out in pilot plant equipment.

EXAMPLE 10

In a clean, dry, 3-neck flask equipped with stirrer, thermometer, Dry Ice-CCl₄ condenser, dropping funnel and scrubber system are charged 6,460 parts of filtered

TABLE 1.—BROMINATION OF BIPHENYL

| | Reactants (parts) | | | | Conditions | | | Products | | | |
|---|---|---|---|---|---|---|---|---|---|---|---|---|
| Example number | $(C_6H_5)_2$ | $Br_2$ | $CH_2Br_2$ | Catalyst | Br₂ equivalent [1] | Time (hours) | Temp. (° C.) | Weight (parts) | Avg. Br number [2] | Wt. percent Br | Melting point (° C.) | Percent yield (based on avg. Br number) |
| 2 | 17.8 | 122 | 197 | 0.88 AlBr₃ | 9.2 | 7.2 | 25–85 | 97.7 | 8.69 | 81.0 | 224–275 | Quantitative. |
| 3 | 17.8 | 122 | 187 | 0.99 AlBr₃ | 9.2 | 4.3 | 25–98.5 | 98.2 | 8.75 | 80.3 | 241–289 | Do. |
| 4 | 17.8 | 157 | 200 | 1.12 AlCl₃ | 8.5 | 2.5 | 25–95 | 85.3 | 8.4 | 80.0 | 198–260 | 90.4. |
| 5 | 17.8 | 161 | 200 | 0.60 AlCl₃ | 8.75 | 3.0 | 25–95 | 95.0 | 8.41 | 79.4 | 193–245 | Quantitative. |
| 6 | 17.8 | 169 | 250 | 0.38 AlCl₃ | 9.2 | 2.75 | 25–95 | 96.5 | 8.53 | 79.6 | 201–263 | Do. |
| 7 | 17.8 | 184 | 267.5 | 1.93 AlCl₃ | 10.0 | 4.0 | 25–95 | 95.5 | 8.85 | 81.6 | 238–293 | 97.4. |
| 8 | 17.8 | 175 | 250 | 0.99 AlCl₃ | 9.5 | 2.1 | 25–95 | 100.0 | 8.9 | 82.2 | 240–310 | Quantitative. |

[1] Br equivalents are number of Br atoms available for reaction with biphenyl from Br₂ charged; calculated by dividing moles of Br₂ by moles of $(C_6H_5)_2$.
[2] Average bromine number—determined by VPC; certain peaks assumed to be hepta-, octa-, nona-, and decabromobiphenyl based on retention time. Area percent used for calculations.

Results similar to the above are obtained when the diphenyl is replaced with triphenyl, benzene, naphthalene, anthracene, xylene, and the like.

It is extremely surprising that the combination of $CH_2Br_2$ and halogenation catalyst of this invention reacts technical grade methylene bromide and 445 parts of technical grade biphenyl. To this was added 4150 parts of bromine over a period of 55 minutes at a temperature between 20–30° C. with evolution of HBr gas. After all the bromine was added, 30 parts of AlBr₃ catalyst was dissolved in 395 parts of methylene bromide and added at a dropwise rate with the temperature at 31° C.

Catalyst addition was continued and the reaction mixture was heated slowly to about 95° C. An additional 53 parts of bromine was added to the reaction mixture. The reaction mixture became almost colorless. An additional 2075 parts of methylene bromide were added to the reaction mixture. The reaction was quenched with concentrated HCl (460 parts) dissolved in 2600 part of water. The reactor temperature was about 95° C. After separating the acid layer, the reaction mixture was washed twice with 3000 parts of water and 4000 parts of water respectively to a pH of about 7. The washing was carried out at about 70–80° C. After separating the organic portion, it was cooled and 1500 parts of methylene bromide were added. This mixture was azeotroped to remove the residual water. The product was recovered from the solvent and dried on a rotary evaporator for 3 hours at 125–130° C. under full vacuum to remove all traces of solvent methylene bromide. After triturating the filter cake with acetone and filtering, the filter cake was dried in a warm air oven at 80° C. for 16 hours. A total of 2100 parts of product representing approximately a 93.1 percent yield.

Analysis showed the weight percent bromine to be 81.6 percent with melting point between 211–290° C.

From the foregoing examples it can be seen that the process of this invention provides a method of tailor-making polybrominated aromatic compounds. The degree of bromination depends on the amount of bromine and catalyst used. When this is controlled, any desired degree of bromination can be obtained producing mixtures of aromatic compounds averaging about 4 bromine atoms up to about 10 bromine atoms per atomic compound.

Such compounds are well known for their use as flame-retardant additives, see U.S. Pat. 3,285,965, as liquid dielectrics, see U.S. Pat. 2,977,516, as flame resistant electric conductor insulation additives, see U.S. Pat. 1,863,147, as heat transfer media, lubricants and like applications wherein high thermal stability and/or flame resistance are advantageous.

The process of this invention as described in the foregoing specification is illustrative and not intended to limit the scope of the following claims.

I claim:

1. In a process for the production of polybrominated aromatic compounds and mixtures thereof having up to about 10 carbon atoms per molecule by reacting an aromatic compound selected from the group consisting of aromatic hydrocarbons, alkyl substituted aromatic hydrocarbons and partially halogenated aromatic hydrocarbons with bromine at a temperature of from room temperature to about 200° C. sufficient to allow a rapid rate of reaction, the improvement comprising conducting said process in a homogeneous system in the presence of a halogenation catalyst selected from the group consisting of aluminum halide and iron halide and in methylene bromide as the reaction solvent.

2. A process of claim 1 wherein said aromatic compound is diphenyl.

3. A process of claim 1 wherein said halogenation catalyst is an aluminum halide selected from $AlCl_3$, $AlBr_3$, and mixtures thereof.

4. A process of claim 3 wherein said halogenation catalyst is $AlBr_3$.

5. A process of claim 3 wherein said halogenation catalyst is $AlCl_3$.

6. A process of claim 1 wherein said halogenation catalyst is first mixed with said solvent prior to carrying out said process.

7. A process of claim 6 wherein said halogenation catalyst is $AlBr_3$.

8. A process of claim 4 wherein said halogenation catalyst is present at a molar ratio of 0.001:1 to 0.01:1 mole of catalyst per mole of bromide.

9. A process of claim 8 wherein said molar ratio is 0.001:1 to 0.007:1 mole of catalyst per mole of bromine.

10. A process of claim 1 wherein said halogenation catalyst is a mixture of $AlCl_3$ and $AlBr_3$ and said aromatic compound is diphenyl.

References Cited

UNITED STATES PATENTS

| | | | |
|---|---|---|---|
| 2,979,537 | 4/1961 | Asadorian | 260—650 R |
| 3,170,961 | 2/1965 | Britton et al. | 260—650 R |
| 3,491,142 | 1/1970 | Yeh et al. | 260—649 R X |
| 2,659,760 | 11/1953 | Freud et al. | 260—650 R |
| 3,285,965 | 11/1966 | Jenkner | 260—649 R |
| 2,452,154 | 10/1948 | Ross | 260—650 R X |

FOREIGN PATENTS

| | | | |
|---|---|---|---|
| 981,833 | 1/1915 | Great Britain | 260—612 |
| 1,029,874 | 5/1966 | Great Britain | 260—649 DP |
| 1,161,547 | 1/1964 | Germany | 260—649 DP |
| 1,145,599 | 3/1963 | Germany | 260—650 R |

HOWARD T. MARS, Primary Examiner

U.S. Cl. X.R.

260—649 R, 649 F, 650 R, 650 F

PO-1050
(5/69)

UNITED STATES PATENT OFFICE
CERTIFICATE OF CORRECTION

Patent No. 3,763,248                    Dated   October 2, 1973

Inventor(s)    Lawrence C. Mitchell

It is certified that error appears in the above-identified patent
and that said Letters Patent are hereby corrected as shown below:

Col. 1, Line 16 reads "catalysts", should read -- catalyst --.
Col. 1, Line 34 reads "requiredment", should read -- requirement --.  Col. 1, Line 69 reads "loses", should read -- losses --.
Col. 2, Line 12 reads "retarants", should read -- retardants --.
Col. 2, Line 16 reads "a", should read -- an --.  Col. 2, Line 25 reads "axact", should read -- exact --.  Col. 2, Line 30 reads "Theimproved", should read -- The improved --.  Col. 2, Line 34 reads "where", should read -- wherein --.  Col. 5, Line 9 reads "NaHO", should read -- NaOH --.  Col. 5, Line 28 reads "decarbromobiphenyl", should read -- decabromobiphenyl --.
Col. 7, line 34 reads "atomic", should read -- aromatic --.
Col. 8, Line 25 reads "bromide", should read -- bromine --.

Signed and sealed this 19th day of February 1974.

(SEAL)
Attest:

EDWARD M.FLETCHER,JR.                C. MARSHALL DANN
Attesting Officer                    Commissioner of Patents